US008828564B2

(12) United States Patent
Clabau

(10) Patent No.: US 8,828,564 B2
(45) Date of Patent: Sep. 9, 2014

(54) ALKALI-BARRIER LAYER

(75) Inventor: Frédéric Clabau, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 14/119,564

(22) PCT Filed: May 24, 2012

(86) PCT No.: PCT/FR2012/051166
§ 371 (c)(1),
(2), (4) Date: Jan. 30, 2014

(87) PCT Pub. No.: WO2012/164206
PCT Pub. Date: Dec. 6, 2012

(65) Prior Publication Data
US 2014/0199552 A1    Jul. 17, 2014

(30) Foreign Application Priority Data

May 30, 2011    (FR) ...................................... 11 54698

(51) Int. Cl.
*B32B 15/04*    (2006.01)
*B32B 17/06*    (2006.01)
*C03C 17/34*    (2006.01)

(52) U.S. Cl.
CPC ......... *C03C 17/3435* (2013.01); *C03C 17/3417* (2013.01); *C03C 2217/214* (2013.01); *C03C 2217/213* (2013.01); *C03C 2217/23* (2013.01); *C03C 2217/228* (2013.01); *C03C 2217/281* (2013.01)
USPC ........... 428/701; 428/426; 428/428; 428/432; 428/688; 428/689; 428/697; 428/698; 428/699; 428/702; 428/704

(58) Field of Classification Search
CPC .......... B23B 9/00; B23B 15/00; B23B 15/04; B23B 17/00; B23B 17/06; B23B 2255/06; B23B 2255/205; B23B 2225/28; B23B 2551/00; C03C 15/00; C03C 17/00; C03C 17/06; C03C 17/23; C03C 17/3411; C03C 17/34; C03C 17/36; C03C 17/3602; C03C 17/3604; C03C 17/3607; C03C 17/361; C03C 17/3613; C03C 17/3615; C03C 17/3639
USPC ........ 428/426, 428, 432, 688, 689, 697, 698, 428/699, 701, 702, 704
See application file for complete search history.

(56) References Cited

U.S. PATENT DOCUMENTS 5,935,702 A * 8/1999 Macquart et al. ............. 428/336
6,398,925 B1 * 6/2002 Arbab et al. ............. 204/192.22
(Continued)

FOREIGN PATENT DOCUMENTS

WO    WO 2011/101444    8/2011

OTHER PUBLICATIONS

International Search Report as issued for International Application No. PCT/FR2012/051166, dated Sep. 13, 2012.

*Primary Examiner* — David Sample
*Assistant Examiner* — Lauren Colgan
(74) *Attorney, Agent, or Firm* — Pillsbury Winthrop Shaw Pittman LLP

(57) ABSTRACT

A glazing incorporating a glass substrate includes, on at least one portion of its surface, a stack of layers including a barrier layer to the migration of ions contained in the substrate, especially of $Na^+$ or $K^+$ alkali metal type, the barrier layer being interposed in the stack between the surface of the substrate and at least one upper layer giving the glazing a functionality of the solar-control, low-emissivity, antireflection, photo¬catalytic, hydrophobic or other type, the barrier layer essentially consisting of a silicon oxide or a silicon oxynitride, wherein the silicon oxide or oxynitride includes one or more elements selected from the group consisting of Al, Ga and B and wherein the Si/X atomic ratio is strictly less than 92/8 in the barrier layer, X being the sum of the atomic contributions of the Al, Ga and B elements.

21 Claims, 2 Drawing Sheets

(56) References Cited

U.S. PATENT DOCUMENTS

| | | | | |
|---|---|---|---|---|
| 6,495,251 B1* | 12/2002 | Arbab et al. | | 428/336 |
| 7,153,578 B2* | 12/2006 | Chonlamaitri et al. | | 428/428 |
| 7,267,879 B2* | 9/2007 | Thomsen et al. | | 428/428 |
| 8,506,768 B2* | 8/2013 | Myli et al. | | 204/192.26 |
| 8,530,011 B2* | 9/2013 | Kleinhempel et al. | | 428/34 |
| 8,728,636 B2* | 5/2014 | Kleinhempel et al. | | 428/701 |
| 2002/0136905 A1* | 9/2002 | Medwick et al. | | 428/432 |
| 2002/0172775 A1 | 11/2002 | Buhay et al. | | |
| 2003/0165693 A1* | 9/2003 | Hartig et al. | | 428/426 |
| 2003/0180547 A1* | 9/2003 | Buhay et al. | | 428/434 |
| 2003/0228476 A1* | 12/2003 | Buhay et al. | | 428/469 |
| 2004/0086723 A1* | 5/2004 | Thomsen et al. | | 428/426 |
| 2004/0219343 A1* | 11/2004 | DePauw | | 428/212 |
| 2006/0121290 A1* | 6/2006 | Chonlamaitri et al. | | 428/428 |
| 2007/0273991 A1* | 11/2007 | List et al. | | 359/887 |
| 2008/0241523 A1* | 10/2008 | Huignard et al. | | 428/336 |
| 2009/0084438 A1 | 4/2009 | den Boer et al. | | |
| 2010/0326817 A1* | 12/2010 | Myli et al. | | 204/192.15 |
| 2011/0203578 A1 | 8/2011 | Thiel | | |
| 2012/0070652 A1* | 3/2012 | Krasnov et al. | | 428/336 |
| 2012/0070672 A1* | 3/2012 | Imran et al. | | 428/432 |

* cited by examiner

ALKALI-BARRIER LAYER

CROSS-REFERENCE TO RELATED APPLICATIONS

This application is the U.S. National Stage of PCT/FR2012/051166, filed May 24, 2012, which in turn claims priority to French Application No. 1154698, filed May 30, 2011. The content of both applications are incorporated herein by reference in their entirety.

The invention relates to a glazing incorporating a glass substrate comprising, on at least one portion of its surface, a stack of layers including a barrier layer to the migration of alkali metal ions contained in said substrate, of the sodium $Na^+$, potassium $K^+$, etc. type. Said layer is contiguous or placed in the immediate vicinity of the glass substrate and protects an upper layer.

Such a glazing thus comprises, in particular, one or more functional layers of the solar-control, low-emissivity (low-e), antireflection, photocatalytic (self-cleaning glazing) or hydrophobic type, that is to say a layer or a succession of layers that give(s) the glazing in question a particular property. An application thereof is thus also found in the devices used for recovering solar light energy and comprising for example a layer of TCO (transparent conductive oxide) type, especially in the field of photovoltaic cells or solar collectors.

In the field of glazings provided with a layer or with a stack of layers having the functionalities stated above, it has long been known to add, between the surface of the glass substrate and the functional layer(s), that is to say the layer(s) more particularly imparting the desired property to the glazing in question, at least one layer referred to as an alkali metal "barrier" layer. As is known, this layer makes it possible to limit the diffusion of the cations, especially of alkali metal type, initially present in the glass substrate and that migrate toward the upper layers (and especially toward the functional layer(s)) throughout the service life or during the heating phase of the glazing. The migration of such cations is well known for being a major cause of degradation and alteration of the properties of such functional layers.

To prevent the migration of such ions, layers of silicon oxide, silicon nitride or else silicon oxynitride are among the most widely used since they are effective and not very expensive to implement. Reference may, for example, be made to application US 2009/0084438, which describes a layer consisting of a silicon oxide, nitride or oxynitride (see in particular paragraph 0048), for the purpose of preventing the migration of alkali metals from a glass substrate toward the active upper layers of TCO or silver type.

However, in most cases, a barrier effect that is effective over the service life, especially if the glazing is subjected to intense heating (toughening, bending, etc.) or to exposure in a wet zone, can only be obtained if a substantial thickness of such materials is deposited between the substrate and the upper layer(s) to be protected. For example, it has been possible to calculate that it is necessary to deposit, by the customary sputtering techniques, barrier layers of $SiO_2$ having a physical thickness of around 50 nm in order to be certain of retaining the photocatalytic properties of an outer layer of $TiO_2$ in the stack, after having subjected the functional glazing to an annealing of the order of 620° C. for 10 minutes.

Taking into account the relatively low deposition rate of such silicon oxide, nitride or oxynitride layers, it therefore proves particularly advantageous to have layers that exhibit an exacerbated barrier effect and which will therefore be able to be deposited with a lesser thickness.

The objective of the present invention is to propose such a glazing, provided with a barrier layer having such properties.

More specifically, the present invention relates to a glazing incorporating a glass substrate comprising, on at least one portion of its surface, a stack of layers including a barrier layer to the migration of ions contained in said substrate, especially of $Na^+$ or $K^+$ alkali metal type, said barrier layer being interposed in said stack between the surface of said substrate and at least one upper layer giving said glazing a functionality of the solar-control, low-emissivity, antireflection, photocatalytic, hydrophobic or other type, said barrier layer essentially consisting of a silicon oxide or a silicon oxynitride, said glazing being characterized in that said silicon oxide or oxynitride also comprises one or more elements selected from the group consisting of Al, Ga or B and in that the Si/X atomic ratio is strictly less than 92/8 in said barrier layer, X being the sum of the atomic contributions of said Al, Ga and B elements.

According to preferred embodiments of the present invention, which may, where appropriate, obviously be combined together:
- the Si/X atomic ratio is less than 92/8 and greater than 70/30, preferably greater than 80/20,
- wherein the Si/X atomic ratio is less than 90/10, preferably less than 88/12,
- the element X is aluminum,
- the element X is gallium,
- the element X is boron,
- the barrier layer comprises at least two elements selected from boron, gallium and aluminum,
- the barrier layer is a silicon oxide,
- the barrier layer is a silicon oxynitride,
- the barrier layer is a silicon oxynitride wherein the N/O atomic ratio is greater than 10/90, preferably greater than 20/80.

The invention also relates to a glazing additionally provided with a second layer identical to the first barrier layer as described previously, but placed on top of said functional layer.

According to possible embodiments of said second layer:
- it essentially consists of a silicon oxide or a silicon oxynitride, comprising one or more elements selected from the group consisting of Al, Ga or B and of which the Si/X atomic ratio is strictly less than 92/8,
- its Si/X atomic ratio of said second layer is less than 90/10, preferably less than 88/12,
- its Si/X atomic ratio is less than 90/10, preferably greater than 88/12,
- its Si/X atomic ratio is greater than 80/20,
- the element X is aluminum,
- the element X is gallium,
- the element X is boron,
- the second layer comprises at least two elements selected from boron, gallium and aluminum,
- the second layer is a silicon oxide,
- the second layer is a silicon oxynitride, for example in which the N/O atomic ratio is greater than 10/90, preferably greater than 20/80.

EXAMPLES

Various barrier layers, consisting of a silicon oxide, optionally of which a portion of the silicon atoms are substituted by Al or B, were deposited on soda-lime glass substrates having a thickness of 2 mm, sold under the reference PLANILUX® by the applicant company. Conventionally, the barrier layers are obtained in magnetron sputtering chambers.

Two targets, of which one is made of $SiO_2$ and the other of $Al_2O_3$ or $B_2O_3$, are used as cathodes and are co-sputtered by a plasma of argon gas in the chamber. Before the depositions, a vacuum is created in the chamber until a residual value of 0.5 millipascal (mPa) is reached, according to techniques well known in the field.

The flow rates and pressures of the gases used for the sputtering of the targets, and also the power applied to each of the targets, are given in table 1 below:

TABLE 1

| | Total pressure (mtorr) | Ar flow rate (sccm) | Target | Power (W) |
|---|---|---|---|---|
| SiAlO | 3 | 40 | $SiO_2$ | 500 |
| | | | $Al_2O_3$ | 80 |
| SiBO | 3 | 40 | $SiO_2$ | 500 |
| | | | $B_2O_3$ | 80 |

SiAlO denotes a barrier layer of an oxide of silicon and aluminum, SiBO denotes a barrier layer of an oxide of silicon and boron. SiXO denotes a barrier layer of an oxide of silicon and of an element X, X being aluminum or boron.

The Si/X ratio varies over the length of the substrate due to the variation between each point of the surface of this substrate and each of the two targets (one made of $SiO_2$ and the other made of $Al_2O_3$ or $B_2O_3$).

The deposition time is adjusted in order to achieve a layer thickness of around 100 nanometers.

Deposited on this first barrier layer, according to the conventional techniques in a magnetron sputtering chamber, is a functional layer of transparent conductive oxide (TCO) of AZO type, consisting of ZnO doped with aluminum (2 percent by weight of aluminum oxide). The thickness of this functional layer is around 200 nm.

Table 2 below summarizes the various examples produced:

TABLE 2

| Example | Stack | X | Si/X (atomic) | Si/X (weight) |
|---|---|---|---|---|
| 1 | Glass/SiXO/AZO | — | — | — |
| 2 | Glass/AZO/SiXO | Al | 96/4 | 96/4 |
| 3 | Glass/AZO/SiXO | Al | 82/18 | 82/18 |
| 4 | Glass/AZO/SiXO | B | 95.5/4.5 | 98.5/1.5 |
| 5 | Glass/AZO/SiXO | B | 87/13 | 95.5/4.5 |

The substrates thus coated with stacks consisting of the barrier layer and the TCO layer are then subjected to a heat treatment consisting of heating at 600° C. for 1 hour, in order to calibrate the performances of the various barrier layers synthesized.

For all the examples, the concentration profiles of sodium ions in the various samples, from the surface down to the glass substrate according to the sequence: surface/AZO (200 nm)/SiXO (100 nm)/glass, were measured by conventional secondary ion mass spectrometry (SIMS) methods.

Figure 1:
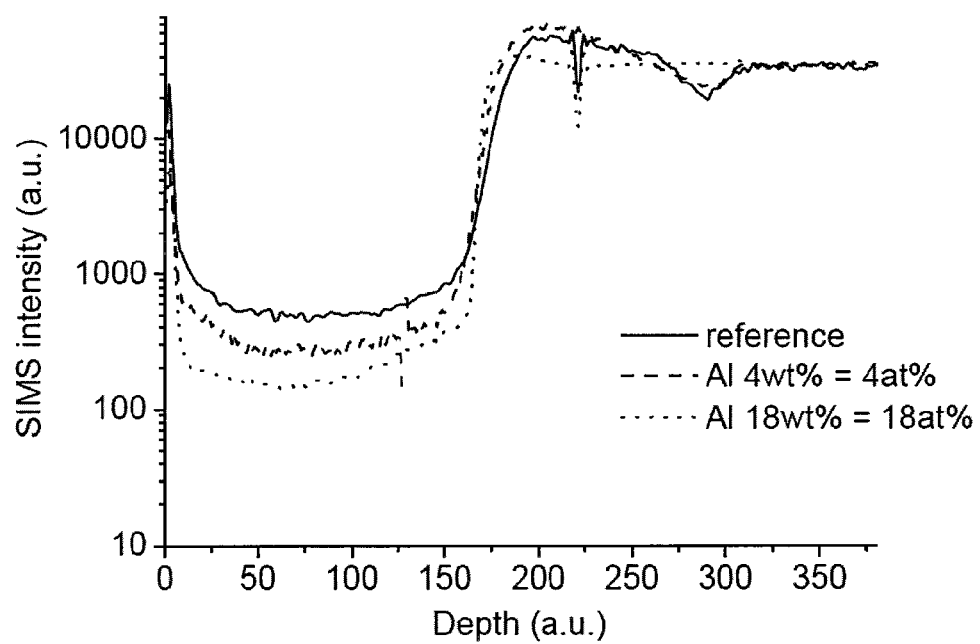
FIG. 1 shows the concentration profiles of sodium ions in various samples, from the surface down to the glass substrate according to the sequence: surface/AZO (200 nm)/SiXO (100 nm)/glass, with X=Al, by conventional secondary ion mass spectrometry (SIMS)
Figure 2:
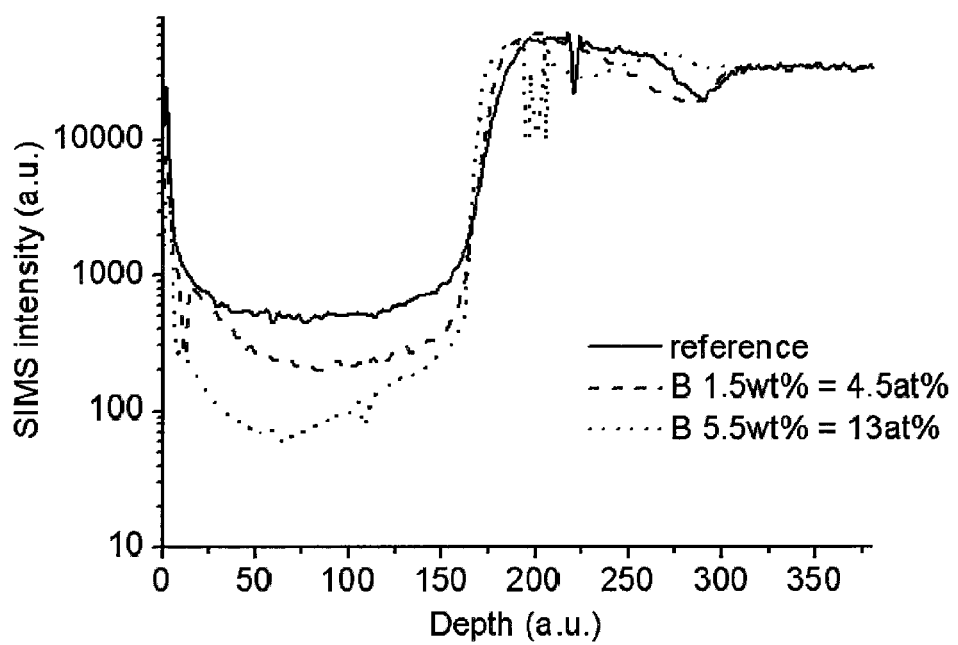
FIG. 2 shows the concentration profiles of sodium ions in various samples, from the surface down to the glass substrate according to the sequence: surface/AZO (200 nm)/SiXO (100 nm)/glass, with X=B, by conventional secondary ion mass spectrometry (SIMS).

The results obtained for the various samples are illustrated by appended FIGS. 1 (X=Al) and 2 (X=B).

In these figures, it can be seen that the AZO layer deposited at the surface of the stack is much better protected from alkali metals in the case where the barrier layer of silicon oxide comprises a large amount of aluminum or boron according to the invention, in particular atomic contents of aluminum or of boron of more than 8%, 9% or even 10%, relative to the sum of the silicon atoms present in said barrier layers. In particular, it is possible to estimate, in view of the curves obtained from the present examples and with respect to the barrier layers made of $SiO_2$ currently used, that the concentration of sodium in the AZO functional layer may be divided by a factor of 10 owing to the use of a protective layer according to the invention.

Additional tests that are identical but that are carried out with barrier layers consisting of silicon oxynitride (with an N/O atomic ratio close to 1) doped in the same manner, gave substantially identical results.

The present invention is described in the foregoing by way of example. It is understood that a person skilled in the art is capable of carrying out various variants of the invention without however departing from the scope of the patent as defined by the claims.

The invention claimed is:

1. A glazing incorporating a glass substrate comprising, on at least one portion of its surface, a stack of layers including a barrier layer to the migration of ions contained in said substrate, said barrier layer being interposed in said stack between the surface of said substrate and at least one upper layer giving said glazing a functionality of a solar-control, low-emissivity, antireflection, photo-catalytic, hydrophobic or other type, said barrier layer essentially consisting of a silicon oxide or a silicon oxynitride, wherein said silicon oxide or oxynitride further comprises Ga and optionally one or more elements selected from the group consisting of Al and B and wherein a Si/X atomic ratio is strictly less than 92/8 in said barrier layer, X being the sum of the atomic contributions of said Ga and said optional one or more elements.

2. The glazing as claimed in claim 1, wherein the Si/X atomic ratio is less than 92/8 and greater than 80/20.

3. The glazing as claimed in claim 1, wherein the Si/X atomic ratio is less than 90/10.

4. The glazing as claimed in claim 3, wherein the Si/X atomic ratio is less than 88/12.

5. The glazing as claimed in claim 1, wherein said silicon oxide or oxynitride further comprises aluminum.

6. The glazing as claimed in claim 1, wherein X is only gallium.

7. The glazing as claimed in claim 1, wherein the silicon oxide or oxynitride further comprises boron.

8. The glazing as claimed in claim 1, comprising boron, gallium and aluminum.

9. The glazing as claimed in claim 1, wherein the barrier layer is a silicon oxide.

10. The glazing as claimed in claim 1, wherein the barrier layer is a silicon oxynitride.

11. The glazing as claimed in claim 10, wherein the barrier layer is a silicon oxynitride wherein the N/O atomic ratio is greater than 10/90.

12. The glazing as claimed in claim 11, wherein the N/O atomic ratio is greater than 20/80.

13. The glazing as claimed in claim 1, comprising an overlayer placed on top of said at least one upper layer, essentially consisting of a silicon oxide or a silicon oxynitride, comprising one or more elements selected from the group consisting of Al, Ga and B and of which the Si/X atomic ratio is strictly less than 92/8.

14. The glazing as claimed in claim 13, wherein the Si/X atomic ratio is less than 90/10.

15. The glazing as claimed in claim 14, wherein the Si/X atomic ratio is less than 88/12.

16. The glazing as claimed in claim 13, wherein the overlayer is a silicon oxide.

17. The glazing as claimed in claim 13, wherein the overlayer is a silicon oxynitride.

18. The glazing as claimed in claim 1, wherein the ions are of $Na^+$ or $K^+$ alkali metal type.

19. A glazing comprising a glass substrate and a stack of layer arranged on at least one portion of a surface of the substrate, the stack of layers including a barrier layer to the migration of ions contained in said substrate, said barrier layer being interposed in said stack between the surface of said substrate and a functional layer giving said glazing a functionality of a solar-control, low-emissivity, antireflection, photo-catalytic, or hydrophobic, said barrier layer consisting essentially of a silicon oxide or a silicon oxynitride, wherein said silicon oxide or oxynitride further comprises Ga and optionally one or more elements and wherein a Si/X atomic ratio is strictly less than 92/8 in said barrier layer, X being a sum of the atomic contributions of said Ga and said optional one or more elements.

20. The glazing as claimed in claim 19, wherein the Si/X atomic ratio is less than 92/8 and greater than 80/20.

21. The glazing as claimed in claim 19, wherein said one or more elements are Al or B, or both Al and B.

* * * * *